US008036859B2

(12) United States Patent  
Dampier

(10) Patent No.: US 8,036,859 B2  
(45) Date of Patent: Oct. 11, 2011

(54) DISAMBIGUATION WITH RESPECT TO MULTI-GRAINED DIMENSION COORDINATES

(75) Inventor: Todd O. Dampier, Mountain View, CA (US)

(73) Assignee: Merced Systems, Inc., Redwood Shores, CA (US)

( * ) Notice: Subject to any disclaimer, the term of this patent is extended or adjusted under 35 U.S.C. 154(b) by 631 days.

(21) Appl. No.: 11/615,694

(22) Filed: Dec. 22, 2006

(65) Prior Publication Data

US 2008/0154556 A1 Jun. 26, 2008

(51) Int. Cl.
*G06F 7/60* (2006.01)
*G06F 17/10* (2006.01)
*G06F 7/00* (2006.01)
*G06F 17/30* (2006.01)

(52) U.S. Cl. ............ 703/2; 707/706; 707/708; 707/725; 707/777

(58) Field of Classification Search ........ 703/2; 705/14; 707/2, 3, 513
See application file for complete search history.

(56) References Cited

U.S. PATENT DOCUMENTS

| | | | | |
|---|---|---|---|---|
| 5,832,496 | A * | 11/1998 | Anand et al. | 707/102 |
| 5,864,857 | A * | 1/1999 | Ohata et al. | 707/100 |
| 6,578,028 | B2 * | 6/2003 | Egilsson et al. | 707/2 |
| 6,735,593 | B1 * | 5/2004 | Williams | 707/102 |
| 6,970,874 | B2 * | 11/2005 | Egilsson et al. | 707/100 |
| 7,653,528 | B2 * | 1/2010 | Kohlmeier et al. | 704/8 |
| 2002/0062315 | A1 * | 5/2002 | Weiss et al. | 707/100 |
| 2002/0095430 | A1 * | 7/2002 | Egilsson et al. | 707/104.1 |
| 2002/0099563 | A1 | 7/2002 | Adendorff et al. | |
| 2002/0116362 | A1 | 8/2002 | Li et al. | |
| 2002/0198909 | A1 * | 12/2002 | Huynh et al. | 707/513 |
| 2003/0023608 | A1 * | 1/2003 | Egilsson et al. | 707/100 |
| 2004/0153435 | A1 * | 8/2004 | Gudbjartsson et al. | 707/1 |
| 2005/0060332 | A1 * | 3/2005 | Bernstein et al. | 707/100 |
| 2005/0080802 | A1 * | 4/2005 | Cras et al. | 707/100 |
| 2007/0233651 | A1 * | 10/2007 | Deshpande et al. | 707/3 |
| 2008/0154856 | A1 * | 6/2008 | Riise et al. | 707/3 |

FOREIGN PATENT DOCUMENTS

CA 2418753 A1 * 8/2003

(Continued)

OTHER PUBLICATIONS

U.S. Appl. No. 11/427,718, filed Jun. 29, 2006.

(Continued)

*Primary Examiner* — David Silver
*Assistant Examiner* — Angel Calle
(74) *Attorney, Agent, or Firm* — Beyer Law Group LLP

(57) ABSTRACT

Each of a plurality of dimension coordinates corresponding to a report query has a finer grain and a coarser grain. A subset of the dimension coordinates are dimension coordinates for which there is ambiguity as to what coarser grain value should be associated with the finer grain value. For every unique finer grain value of the dimension coordinates of the subset, it is determined what coarser grain value to associate with all dimension coordinates of the subset having that finer grain value. The determined coarser grain value is the coarser grain value of one of the dimension coordinates, of the subset, having that finer grain value. For each of the dimension coordinates of the plurality of dimension coordinates not in the subset, the coarser grain value associated with that dimension coordinate is the coarser grain value of that dimension coordinate. A report is generated in view of the plurality of dimension coordinates and their associated coarser grain values.

25 Claims, 5 Drawing Sheets

FOREIGN PATENT DOCUMENTS

EP 1450274 8/2004

OTHER PUBLICATIONS

Kimball, Ralph, "Kimball Design Tip #8: Perfectly Partitioning History with the Type 2 Slowly Changing Dimension", No. 8, May 21, 2000, www.kimballgroup.com.

Kimball, Ralph, "Human Resource Data Marts: Design Guidelines for Querying and Analyzing Employee Data", DBMS online, http://www.dbmsmag.com/9802d05.html, printed on Jun. 14, 2006.

Kimball, Ralph, "Surrogate Keys: Keep Control Over Record identifiers by Generating New Keys for the Data Warehouse", DBMS online, http://www.dbmsmag.com/9805d05.html, printed on Jun. 14, 2006.

Kimball, Ralph, "Pipelining Your Surrogates: A Good Surrogate Key System is Worth the Work", DBMS online, http://www.dbmsmag.com/9806d05.html, printed on Jun. 14, 2006.

International Search Report in corresponding PCT application PCT/US2007/087104, mailed Jun. 5, 2008.

Written Opinion in corresponding PCT application PCT/US2007/087104, mailed Jun. 5, 2008.

Samtani et al., "Recent Advances and Research Problems in Data Warehousing," Advancing in Database Technologies. Workshops on Data Warehousing and Data Mining, Mobile Data Access and Collaborative Work Support and Spatio-Temporal Data Management, Nov. 19, 1998, pp. 81-92.

Riedewald et al., " Efficient Integration and Aggergation of Historian Infonrmation," Sigmod 2002. Proceedings of the ACM Sigmod International Conference on the Management of Data, Madison, WI, Jun. 4-6, 2002, pp. 13-24.

Bauer et al, "Data-Warehouse-Systeme," Architektur Entwicklung Anwendung, 2001, pp. 183-195, Heidleberg Germany.

Reiger, B. "Mastering Time Variences of Dimension Tables in the Data Warehouse," Internet Citation, Apr. 14, 1999, Retrieved from the Internet: URL: http://andromeda.oec.uni-osnabrueck.de/uwdstift/DMOS-ref.pdf, retrieved on Nov. 14, 2007.

* cited by examiner

DISAMBIGUATION WITH RESPECT TO MULTI-GRAINED DIMENSION COORDINATES

BACKGROUND

The present invention is in the field of processing a report query to a dimensionally-modeled fact collection (i.e., facts of or derived from a collection of facts organized as, or otherwise accessible according to, a dimensional data model). In particular, the present invention relates to reporting on facts considering the phenomena in which a grain value at a second grain ("finer grain values" at a "finer grain") of one or more dimension coordinates satisfying a dimension coordinate constraint of the report query may also be the finer grain value for other dimension coordinates that also satisfy the dimension coordinate constraint but that have a different grain value at a first grain that is coarser than the finer grain ("coarser grain value" at a "coarser grain"). For readers not familiar with this terminology, the terminology of dimension coordinates, grains and grain values (including the properties of fineness and coarseness) are discussed below.

More particularly, it is known to respond to a report query to a dimensionally-modeled fact collection (facts organized in an n-dimensional data space) by performing operations with respect to dimension coordinates that satisfy a dimension coordinate constraint of the report query. Locations in an n-dimensional data space are specified by n-tuples of coordinates, where each member of the n-tuple corresponds to one of the n dimensions. For example, ("San Francisco", "Sep. 30, 2002") may specify a location in a two-dimensional data space, where the dimensions are LOCATION and TIME. Coordinates need not be single-grained entities. That is, coordinates of a single dimension may exist at, or be specified with respect to, various possible grains (levels of detail). In one example, a coordinate of a LOCATION dimension comprises the following grains: CONTINENT, COUNTRY and CITY.

The order of the grains may have some hierarchical significance. The grains are generally ordered such that finer grains are hierarchically "nested" inside coarser grains. Using the LOCATION dimension example, the CITY grain may be finer than the COUNTRY grain, and the COUNTRY grain may be finer than the CONTINENT grain. Where the order of the grains of a dimension has hierarchical significance, the value of a coordinate of that dimension, at a particular finer grain, is nominally such that the value of the coordinate of that dimension has only one value at any coarser grain for that dimension. In an example, a value of a coordinate of a LOCATION dimension may be specified at the CITY grain of the LOCATION dimension by the value "Los Angeles." This same coordinate has only one value at the COUNTRY and CONTINENT grains: "United States" and "North America," respectively.

SUMMARY

Processing a report query to a dimensional data model includes processing a plurality of dimension coordinates that exist within the dimensional data model. Each of the plurality of dimension coordinates has a second particular grain ("finer grain") that is finer than a first particular grain ("coarser grain"). The report query specifies a dimension coordinate constraint to which the plurality of dimension coordinates correspond.

A subset of the plurality of dimension coordinates are dimension coordinates for which there is ambiguity as to what coarser grain value to associate with the finer grain value. That is, for the subset of the plurality of dimension coordinates, each of the dimension coordinates of the subset is such that there is at least one other dimension coordinate of the subset having a value at the finer grain ("finer grain value") that is the same as the finer grain value of that dimension coordinate, and the at least one other dimension coordinate also has a value at the coarser grain ("coarser grain value") that is different from the coarser grain value of that dimension coordinate.

For every unique finer grain value of the dimension coordinates of the subset, it is determined what coarser grain value to associate with all dimension coordinates of the subset having that finer grain value. The determined coarser grain value is the coarser grain value of one of the dimension coordinates, of the subset, having that finer grain value. For each of the dimension coordinates of the plurality of dimension coordinates not in the subset, the coarser grain value associated with that dimension coordinate is the coarser grain value of that dimension coordinate.

A report is generated in view of the plurality of dimension coordinates and their associated coarser grain values.

DETAILED DESCRIPTION

Figure 1:
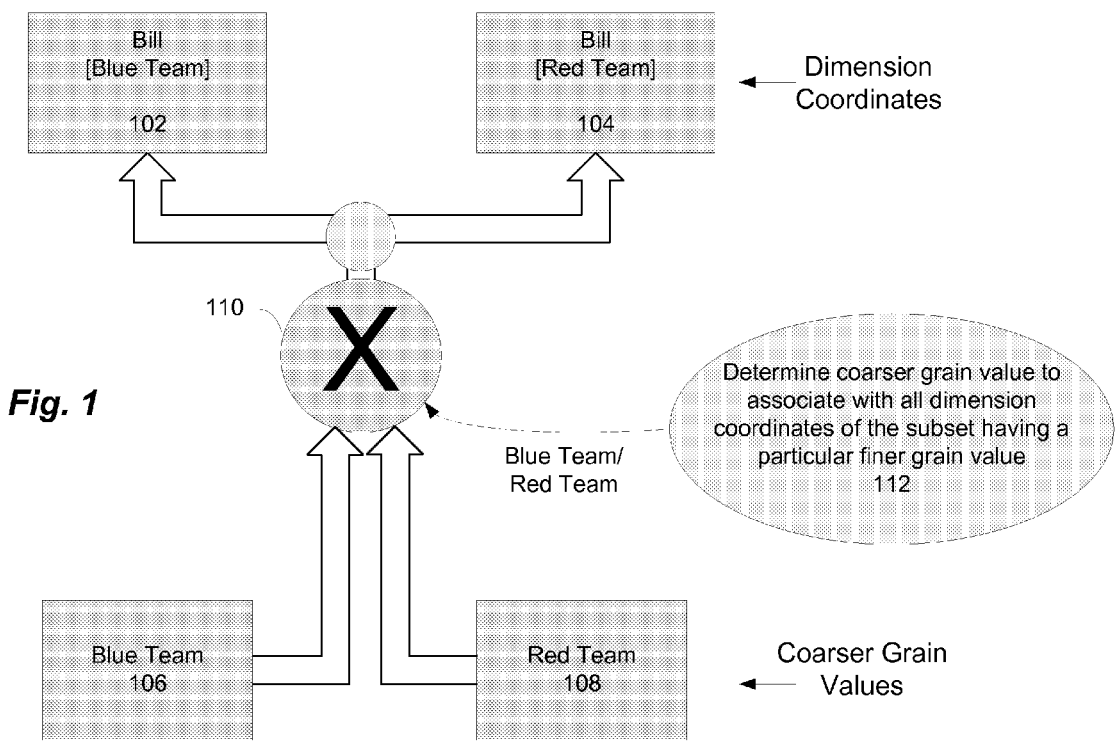
FIG. 1 graphically illustrates a simple situation in which there is only one finer grain value for which there is an ambiguity and, further, the ambiguity is between only two possible coarser grain values.

The inventors have realized that it is desirable to consider the phenomenon in which, for a subset of a plurality of dimension coordinates that satisfy a report query, there are dimension coordinates of the subset that have the same grain value at a finer grain but a different grain value at a coarser grain. In this case, when performing operations with respect to dimension coordinates of this subset, there is ambiguity as to what coarser grain value to associate with the finer grain value.

This phenomenon may arise, for example, when one or more dimensions in which the dimension coordinates exist is a slowly changing dimension. This is a phenomenon in which the relationship of grains for a dimension may change over time. While it may be contrived to consider the concept of slowly changing dimensions with reference to the example LOCATION dimension (since, generally, the relationship of CONTINENT, COUNTRY and CITY grains will not change over time), there are other more realistic examples of this phenomenon.

As one illustration, consider an EMPLOYEE dimension that is intended to represent an organizational chart of a company. In this example, the EMPLOYEE dimension comprises the following grains: ORGANIZATION, DIVISION, TEAM and PERSON. Using this example, it can be seen that values of coordinates at various grains may change as a person moves from one team to another team (or, perhaps, a team moves from one division to another division). For example, at the beginning of one quarter, Bill worked on the Red Team; sometime during the quarter, Bill moved to the Blue Team. This may be modeled by one EMPLOYEE dimension coordinate having the value "Bill" at grain PERSON and the value "Red Team" at grain TEAM, plus a second EMPLOYEE dimension coordinate also having the value "Bill" at grain PERSON but the value "Blue Team" at grain TEAM. It is also possible to encode in the representation of the dimension coordinates the specific time intervals during which these grain relationships obtained.

As a simplistic example of an operation to be performed with respect to dimension coordinates satisfying a dimension coordinate constraint, it may be desired to compute the average number of cookies eaten by each team's members during Q4 2005. This computation considers multiple dimensional grains. That is, the statistical population is defined at the PERSON grain (cookies eaten by members), while the reported result is at the TEAM grain (i.e., the results are reported on a per team basis) for the time period corresponding to the Q4 2005 time reporting label (shorthand—"Q4 2005 time period").

Consider the following dimension coordinates, and metric values, characterized by a time period corresponding to the Q4 2005 time period:

TABLE 1

| Person Dimension Coordinate | Metric Value (# cookies) | Time Reporting Label |
| --- | --- | --- |
| Mary: Red Team | 100 | Q4-2005 |
| Bill: Red Team | 60 | Q4-2005 |
| Bill: Blue Team | 60 | Q4-2005 |
| Saul: Blue Team | 90 | Q4-2005 |

The cookie eating metric values could be left attached to both the PERSONs and TEAMs to which they accrued, and an average could be computed as:

Result 1-1

Red Team=(100+60)/2=80

BlueTeam=(60+90)/2=75

This preserves an ambiguity about Bill's team membership during the Q4 2005 time period and artificially deflates the per PERSON average of both teams, since Bill is counted twice.

On the other hand, the ambiguity about Bill's team membership during the Q4 2005 time period can be arbitrarily disambiguated. For example, all of Bill's cookie eating metric values for the Q4 2005 time period could be attributed to the Red Team, even metric values for cookies eaten by Bill while Bill was on the Blue Team:

Result 1-2

RedTeam=(100+(60+60))/2=110

Blue Team=(90)/1=90

Or, all of Bill's cookie eating metric values could be attributed to the Blue Team for the Q4 2005 time period, even metric values for cookies eaten by Bill while Bill was on the Red Team:

Result 1-3

Red Team=(100)/1=100

Blue Team=((60+60)+90)/2=105

In accordance with an aspect of the invention, then, and referring to the specific example of Bill and the Red Team and Blue Team, a determination is made whether those dimension coordinates corresponding to the Q4 2005 time reporting label and having a value of Bill at the PERSON grain are treated as having a value of Red Team or of Blue Team at the TEAM grain. Thus, for example, if it is determined that dimension coordinates having a value of Bill at the PERSON grain are to be treated as having a value of Red Team at the TEAM grain, then even the dimension coordinate having a value of Bill at the PERSON grain and having a value of Blue Team at the TEAM grain will be treated as having a value of Red Team at the TEAM grain.

More generally, there may be a subset of a plurality of dimension coordinates satisfying a dimension coordinate constraint of a report query, where each dimension coordinate of the subset is such that there is at least one other dimension coordinate of the subset having a finer grain value that is the same as the finer grain value of that dimension coordinate (e.g., Bill at the PERSON grain) and the at least one other dimension coordinate also has a coarser grain value that is different from the coarser grain value of that dimension coordinate (e.g., another dimension coordinate has a value of Red Team at the TEAM grain and that dimension coordinate has a value of Blue Team at the TEAM grain). In accordance with the aspect, for every unique finer grain value of the dimension coordinates of the subset (e.g., Bill is a unique grain value at the PERSON grain), the coarser grain value to associate with all dimension coordinates of the subset having that finer grain value is considered to be the coarser grain value of one of the dimension coordinates, of the subset, having that finer grain value (e.g., the coarser grain value to associate with the finer grain value of Bill is considered to be either Red Team or Blue Team).

FIG. 1 illustrates this aspect graphically. With respect to FIG. 1, the PERSON grain is the finer grain and the TEAM grain is the coarser grain. The dimension coordinate 102 and the dimension coordinate 104 are considered to be dimension coordinates of a "subset." (As mentioned above, each dimension coordinate of a subset is such that there is at least one other dimension coordinate of the subset having a finer grain value that is the same as the finer grain value of that dimension coordinate and the at least one other dimension coordinate also has a coarser grain value that is different from the coarser grain value of that dimension coordinate.) More particularly, the dimension coordinate 102 and the dimension coordinate 104 each have the value Bill at the PERSON grain (finer grain), but the dimension coordinate 102 and the dimension coordinate 104 have different values at the TEAM grain. That is, the dimension coordinate 102 has the value Blue Team at the TEAM grain, and the dimension coordinate 104 has the value Red Team at the TEAM grain.

Some mechanism has been used to determine and process the time period by which the dimension coordinates 102 and 104 are characterized and, thus, to associate each of the dimension coordinates 102 and 104 (and, perhaps, one or more dimension coordinates that are not shown, for which there is no ambiguity as to what coarser grain value to associate with the finer grain values) with a particular time reporting label. In the FIG. 1 examples, the (one and only) particular time reporting label is Q4 2005.

There are various mechanisms by which dimension coordinates may be associated with time reporting labels One example is described in pending U.S. patent application Ser. No. 11/427,718, entitled "Temporal Extent Considerations in Reporting on Facts Organized as a Dimensionally-Modeled Fact Collection," filed on Jun. 29, 2006 and incorporated by reference herein in its entirety for all purposes. For example, in the U.S. patent application Ser. No. 11/427,718, the following description is provided:

In one example, the multidimensional fact collection includes metadata that provides information from which the temporal characteristics of the grain relationships can be discerned. (See, for example, the article entitled "Kimball Design Tip #8: Perfectly Partitioning History With The Type 2 Slowly Changing Dimension," available at http slash slash www dot kimballgroup dot com slash html slash designtipsPDF slash Design-Tips2000%20 slash KimballDT8Perfectly dot pdf, which describes augmenting dimension records with "time stamps" to temporally characterize the dimension records.)

For purposes of the present discussion, however, it should just be considered that a particular association of dimension coordinates to time reporting label(s) has been or can be somehow determined.

Referring still to FIG. 1, block 106 represents the coarser grain value of Blue Team, whereas block 108 represents the coarser grain value of Red Team. It can be seen that Blue Team and Red Team are each a possible coarser grain value to associate with the finer grain value of Bill, which is the finer grain value at the PERSON grain of both the dimension coordinate 102 and the dimension coordinate 104. In the FIG. 1 diagram, the "switch" 110 graphically represents a result of a disambiguation determination 112 as to which of the Blue Team value and the Red Team value is to be associated with the finer grain value of Bill, at the PERSON grain.

For example, if the result of the disambiguation determination 112 is that the Blue Team value is to be associated with the value Bill at the PERSON grain, then the switch 110 is figuratively positioned such that the Blue Team value 106 is associated with the value of Bill at the PERSON grain for the dimension coordinate 102 and the dimension coordinate 104, even though the dimension coordinate 104 has an actual value of Red Team at the TEAM grain. Referring to the examples above—computing the average number of cookies eaten by each team's members for the Q4 2005 time period—this would result in processing the dimension coordinates as set forth with respect to Result 1-3 above.

On the other hand, if the result of the disambiguation determination 112 is that the Red Team value is to be associated with the value Bill at the PERSON grain, then the switch 110 is figuratively positioned such that the Red Team value is associated with the value of Bill at the PERSON grain for both the dimension coordinate 102 and the dimension coordinate 104, even though the dimension coordinate 102 has an actual value of Blue Team at the TEAM grain. Again referring to the examples above—computing the average number of cookies eaten by each team's members during Q4 2005—this would result in processing the dimension coordinates as set forth with respect to Result 1-2 above.

It is noted that FIG. 1 represents a simple situation in which, for a particular subset of dimension coordinates, there is only one finer grain value for which there is an ambiguity as to an associated coarser grain value and, further, the ambiguity is between only two possible coarser grain values. By extension, there may be situations in which there is more than one finer grain value for which there is an ambiguity. In general, for example, these situations may be handled by separately disambiguating for each finer grain value for which there is an ambiguity. Furthermore, an ambiguity may be between more than two possible coarser grain values. Where an ambiguity is between more than two possible coarser grain values, the disambiguation results in a single one of the possible coarser grain values being associated with a particular finer grain value.

As mentioned several time above, we may collectively denote the dimension coordinates having finer grain values for which there is an ambiguity as a "subset" of dimension coordinates. Furthermore, FIG. 1, along with Table 1 and Results 1-2 and 1-3, illustrates an example where not only the dimension coordinates of the subset, but also the dimension coordinates of the larger group to which the subset belongs, have all been determined to be associated with a single particular time period. In particular, the example is one in which each of the dimension coordinates considered for disambiguation corresponds to the time period of the single Q4 2005 time reporting label.

Figure 2:
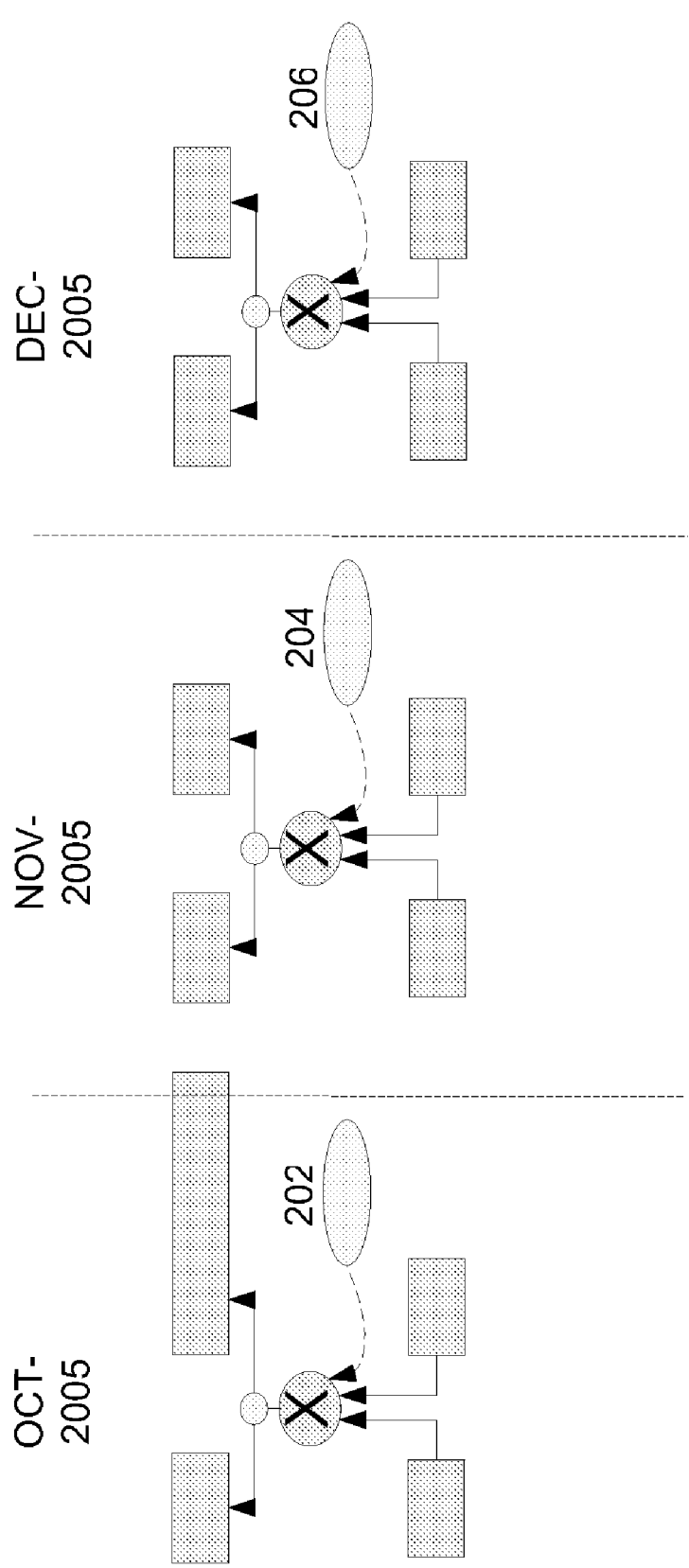
FIG. 2 graphically illustrates an example in which, similar to the FIG. 1 example, disambiguation separately occurs with respect to disambiguation time chambers for each time reporting label of the time reporting range of the report query.

Turning now to FIG. 2, unlike the FIG. 1 example, FIG. 2 exhibits an example for which there is more than a single time reporting label. That is, with respect to FIG. 2, a report is on the average number of cookies eaten by each team's members during Q4 2005, the time reporting range, reported on a monthly basis. The number of time reporting labels is three—October 2005, November 2005 and December 2005.

According to this example, each time reporting label corresponds to a separate non-overlapping time period, namely, the time periods associated with the October 2005, November 2005 and December 2005 time periods. In addition, each dimension coordinate satisfying the dimension coordinate constraint of a report query is associated with one of the separate non-overlapping time periods which we call "disambiguation time chambers." Each disambiguation time chamber corresponds to a different non-overlapping time period of the time reporting range, and the subsets for which there is disambiguation exist on a disambiguation time chamber by disambiguation time chamber basis, based on a correspondence between a time period with which a dimension coordinate is associated and a time period associated with a disambiguation time chamber.

FIG. 2 illustrates a simple example, in which the disambiguation time chambers are at the same resolution as the time reporting labels and, thus, the disambiguation time chambers coincide with the time reporting labels. Since the disambiguation time chambers coincide with time reporting labels in the FIG. 2 example, not only do the subsets exist on a disambiguation time chamber by disambiguation time chamber basis, it also follows that the subsets exist on a time reporting label by time reporting label basis. In the FIG. 2 example, there may be a subset for which there is disambiguation for each of the October 2005, November 2005 and December 2005 time periods. By contrast, we explain later with respect to the FIG. 3 example how the disambiguation time chambers may be at a coarser resolution than the time reporting labels and, thus, each disambiguation time chamber may simultaneously correspond to two or more time reporting labels. (We also note that a particular dimension coordinate may be associated with more than one of the time periods with which time reporting labels are associated. We will note an example of this with reference to Table 2, later in this description.)

Perhaps an easier way to consider this concept is that a time period to which each separate set of dimension coordinates corresponds is defined by a time period to which one or more of the time reporting labels corresponds. For shorthand, we refer to the time period to which one of the separate sets of dimension coordinates corresponds as a "disambiguation time chamber." In the FIG. 1 example, there is one disambiguation time chamber, and it corresponds to the Q4 2005 time period. In the FIG. 2 example, there are three disambiguation time chambers, and the three disambiguation time chambers correspond to the October 2005, November 2005 and December 2005 time periods, respectively. Later, we will see that not only may a disambiguation time chamber be defined by the time period to which one of the time reporting labels corresponds but, also, a disambiguation time chamber may be defined by the time period to which more than one of the time reporting labels collectively correspond (or, put another way, a disambiguation time chamber may correspond to one or more time reporting labels).

Before leaving FIG. 2, we again mention that, as discussed above relative to FIG. 1, for each subset of dimension coordinates considered for disambiguation, there may be one or more finer grain values for which there is an ambiguity as to what is the associated coarser grain value. For example, maybe there is only an ambiguity as to the coarser grain value associated with "Bill" or maybe there is an ambiguity as to the coarser grain value associated with "Bill" and there is also an ambiguity as to the coarser grain value associated with "Steve." Furthermore, for a particular one of those finer grain values, the disambiguation may be among two or more coarser grain values (e.g., the disambiguation may be among Red Team and Blue team, or the disambiguation may be Red Team, Blue Team and Green Team).

We now discuss an example in which a situation like the FIG. 2 situation may apply. That is, we discuss an example in which there are multiple disambiguation time chambers, the disambiguation time chambers being at the same resolution as the time reporting labels such that each disambiguation time chamber corresponds to one separate time reporting label. Consider the following dimension coordinates, metric values and time reporting labels:

TABLE 2

| Person Dimension Coordinate | Metric Value (# cookies) | Time Reporting Label |
|---|---|---|
| Mary: Red Team | 25 | OCT 2005 |
| Mary: Red Team | 35 | NOV 2005 |
| Mary: Red Team | 40 | DEC 2005 |
| Bill: Red Team | 40 | OCT 2005 |
| Bill: Red Team | 20 | NOV 2005 |
| Bill: Blue Team | 20 | NOV 2005 |
| Bill: Blue Team | 40 | DEC 2005 |
| Saul: Blue Team | 30 | OCT 2005 |
| Saul: Blue Team | 30 | NOV 2005 |
| Saul: Blue Team | 30 | DEC 2005 |

(Above, it was mentioned that an example would be discussed, with reference to Table 2, of a particular dimension coordinate being associated with more than one of the time periods to which time reporting labels correspond. In Table 2, an example of such a dimension coordinate includes the dimension coordinate having the value Mary at the PERSON grain and having the value Red Team at the TEAM grain. This dimension coordinate is associated with all of the following time reporting labels: October 2005, November 2005 and December 2005.)

With respect to the Table 2 dimension coordinates, metric values and time reporting labels, the cookie eating metric values could be left "attached" to both the PERSONs and TEAMs to which it accrued (i.e., no disambiguation), and an average per team, per each time reporting label, could be computed as:

Results 2-1

| Month | Red Team | Blue Team |
|---|---|---|
| OCT-2005 | (25 + 40)/2 = 32.5 | (30)/1 = 30 |
| NOV-2005 | (35 + 20)/2 = 27.5 | (20 + 30)/2 = 25 |
| DEC-2005 | (40)/1 = 40 | (40 + 30)/2 = 35 |

As with Result 1-1 above, it is noted how the per-PERSON average is artificially depressed for both TEAMs for the time reporting label November 2005, corresponding to the month Bill changed teams.

Alternatively, for a disambiguation time chamber defined by the time period to which the November 2005 time reporting label corresponds, the TEAM value of Red Team could be attributed to Bill for the November 2005 time reporting label. (It is noted that, with respect to the dimension coordinates in Table 2, dimension coordinates associated with the November 2005 disambiguation time chamber are the only dimension coordinates for which an ambiguity exists as to coarser grain values associated with particular finer grain values.)

Results 2-2

| Month | Red Team | Blue Team |
|---|---|---|
| OCT-2005 | (25 + 40)/2 = 32.5 | (30)/1 = 30 |
| NOV-2005 | (35 + (20 + 20))/2 = 37.5 | (30)/1 = 30 |
| DEC-2005 | (40)/1 = 40 | (40 + 30)/2 = 35 |

While the Table 2 dimension coordinates are such that disambiguation is not appropriate for dimension coordinates other than a subset of dimension coordinates characterized by a time to which the November 2005 time reporting label corresponds (i.e., associated with the disambiguation time chamber defined by the November 2005 time period), for other dimension coordinates, it may be appropriate for there to be disambiguation for dimension coordinates of a subset of dimension coordinates associated with the disambiguation time chamber defined by the October 2005 time period and/or for the dimension coordinates of a subset of dimension coordinates associated with the disambiguation time chamber defined by the December 2005 time period (invoking determination 202 and/or determination 206).

As another alternative with respect to the Table 2 data, the disambiguation for the dimension coordinates associated with the disambiguation time chamber defined by the November 2005 time period could result in the TEAM value of Blue Team being attributed to Bill for the November 2005 time reporting label.

Results 2-3

| Month | Red Team | Blue Team |
| --- | --- | --- |
| OCT-2005 | (25 + 40)/2 = 32.5 | (30)/1 = 30 |
| NOV-2005 | (35)/1 = 35 | (30 + (20 + 20))/2 = 35 |
| DEC-2005 | (40)/1 = 40 | (40 + 30)/2 = 35 |

It can thus be seen that, in general, a disambiguation may occur separately for any or all disambiguation time chambers (which correspond to time reporting labels by being defined by time periods to which the time reporting labels correspond) for which there is reporting based on the report query.

Furthermore, unlike the FIG. 1 and FIG. 2 example, in which the disambiguation time chambers each correspond to a separate single respective time reporting label, there may be examples in which the disambiguation time chambers each correspond to more than one time reporting label. For example, the reporting labels may be at a month resolution (e.g., January 2005, February 2005, . . . , November 2005 and December 2005) of the time dimension. The disambiguation time chambers, may on the other hand, be at a quarter resolution (e.g., Q1 2005, Q2 2005, Q3 2005 and Q4 2005). In other words, all the dimension coordinates characterized by a time period that corresponds to any time reporting label for a month in a particular quarter would be associated with that particular quarter for disambiguation purposes.

Figure 3:
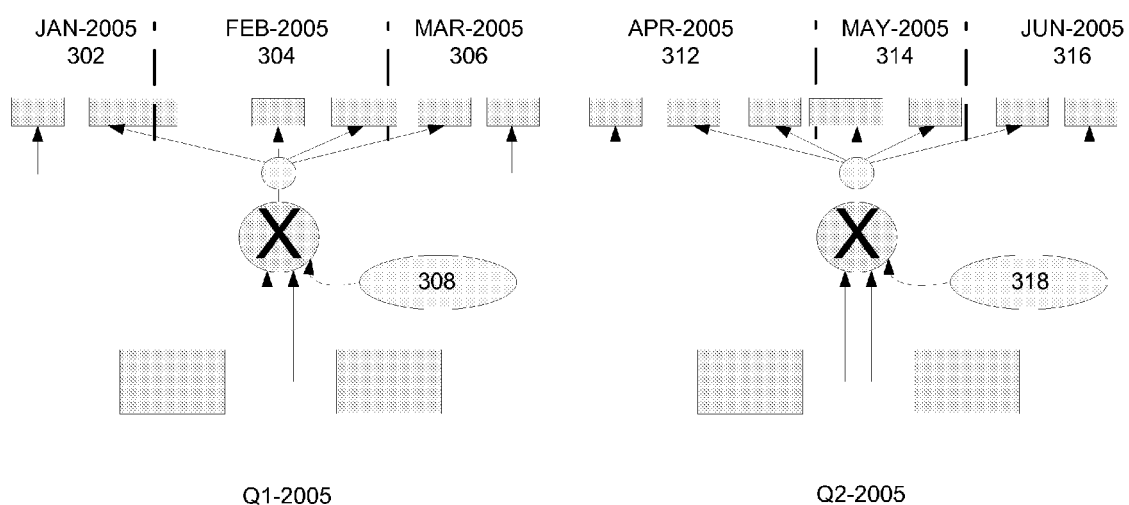
FIG. 3 graphically illustrates an example in which a disambiguation occurs for a disambiguation time chamber that spans more than one time reporting label.

FIG. 3 illustrates such an example. Referring to FIG. 3, dimension coordinates are shown that are associated with time periods corresponding to the time reporting labels January 2005 (302), February 2005 (304), March 2005 (306), April 2005 (312), May 2005 (314) and June 2005 (316). Dimension coordinates associated with time periods corresponding to the remaining time reporting labels for 2005 are not shown, to simplify the illustration.

Using the example of the month resolution and quarter resolution of the 2005 time period, the disambiguation time chambers would be defined by each quarter-year time period of the whole year, for a total of four disambiguation time chambers. Again, there are four disambiguation time chambers for the 2005 time period, even though there are twelve time reporting labels for the 2005 time period. That is, the disambiguation decision for each PERSON grain entity could thus be made up to four times, once for each quarter (e.g., determinations 308 and 318 for the first and second quarter, respectively), even though the report processing is carried out twelve times, once for each "month" time reporting label.

In the discussion thus far, we have not described what criterion may be used to make particular disambiguation determinations (such as, for example, the determination 112 in FIG. 1; the determinations 202, 204 and 206 in FIG. 2; and the determinations 308 and 218 in FIG. 3).

In one example, relative to a disambiguation time chamber that corresponds to November 2005, it is supposed that Alice worked for Red Team from before November 2005 and up until 6 Nov. 2005. Alice worked for Green Team from 7 Nov. 2005 to 21 Nov. 2005. Finally, Alice worked for Blue Team from 22 Nov. 2005 until well after November 2005. Furthermore, Alice eats one cookie every day she works, and she works every day in November.

Further, suppose each team was allotted a bonus budget. Red Team's bonus budget is $3K, Green Team's bonus budget is $5 k and Blue Team's bonus budget is $7 k. Disambiguating Alice's team for the November 2005 disambiguation time chamber, various criteria may be considered, with varying results as to the coarser grain value (value at TEAM grain) to associate with the finer grain value of Alice (value at PERSON grain).

For example, if criterion equals "latest team," then the result is Blue Team. If the criterion equals "earliest team," then the result equals Red Team. It is noted that the "latest team" and "earliest team" criteria are time based. Other criteria may include, for example, "longest team membership during time of disambiguation time chamber." For this criterion, the results equals "Green Team." For the criterion of "highest bonus budget," the result equals Blue Team. For the criterion of "team on which she ate the most cookies," the result equals "Green Team."

It can be seen, then, that many different criteria may be used.

We now discuss some particulars of the processing that may be done in view of the association of coarser grain values with finer grainer values, where such an association may be a result of a disambiguation. In particular, processing for generating the report may include associating metric values in a "copying down" or "rolling up" direction. "Rolling up" includes associating, with a coarser grain value, a metric value that corresponds to a finer grain value (i.e., rolling up from finer to coarser) with which that coarser grain value is associated. Determining, for each month, the average number of cookies per person (metric value that corresponds to a finer grain value—at PERSON grain) eaten by each of Red Team and Blue Team (coarser grain value—at TEAM grain) is an example of rolling up. In other words, "rolling up" includes associating in a many (finer grain values) to one (coarser grain value) manner.

"Copying down" includes associating, with finer grain values, a metric value that corresponds to a coarser grain value (i.e., copying down from coarser to finer). An example of copying down includes, for each month, associating the team goal (coarser grain value—at TEAM grain) for every person (finer grain value—at PERSON grain). In other words, "copying down" includes associating in a one (coarser grain value) to many (finer grain value) manner.

In either case (copying down or rolling up), the disambiguation is useful for resolving what coarser grain value is to be associated with finer grain values, for which the association may otherwise be ambiguous.

Figure 4:
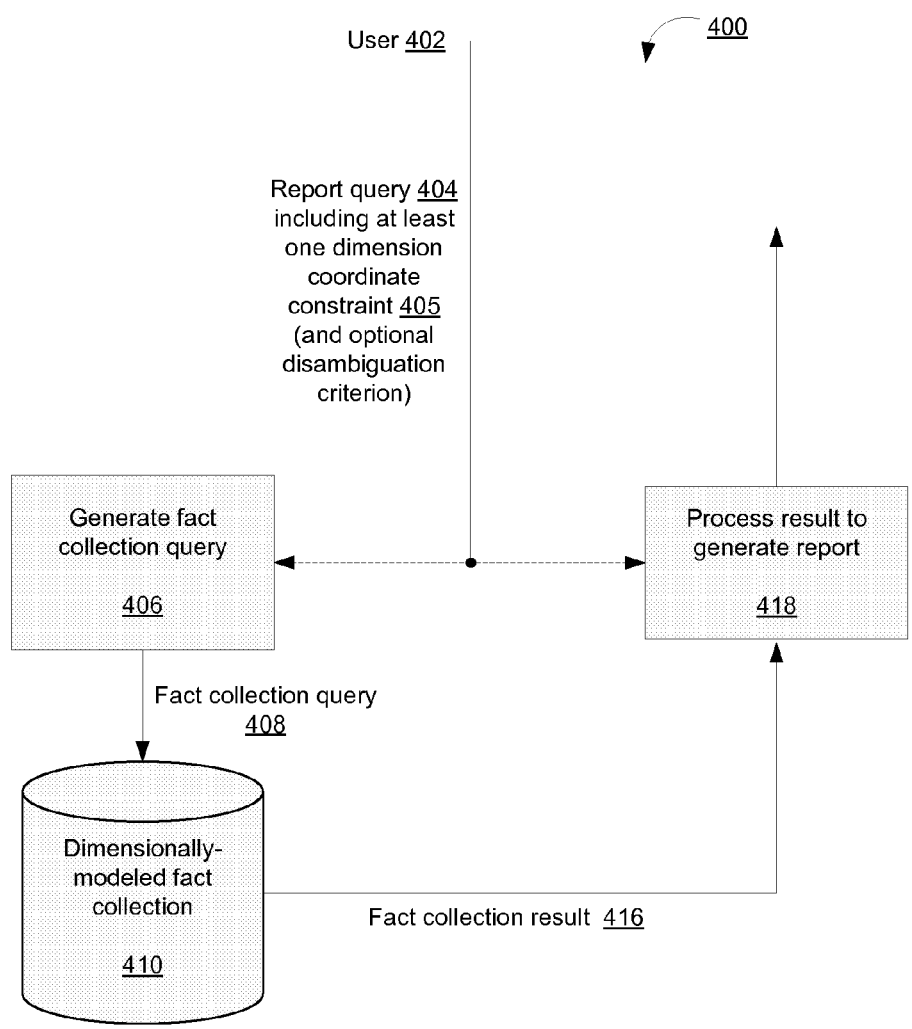
FIG. 4 is a block diagram illustrating an example architecture of a system in which reporting of facts of a dimensionally-modeled fact collection may be performed, including disambiguating as desired or as otherwise determined to be appropriate.

FIG. 4 is a block diagram illustrating an example architecture of a system 400 in which reporting of facts of a dimensionally-modeled fact collection may be performed, including disambiguating as desired or as otherwise determined to be appropriate. Referring to FIG. 4, a user 402 may cause a report query 404 to be provided to a fact collection query generator 406. For example, the user 402 may interact with a web page via a web browser, where the web page is served by a report user interface using, for example, a Java Server Page mechanism. In this example, the user 402 interacts with the web page such that the report query 404 is provided to the fact collection query generator 406. The report query 104 includes a dimension coordinate constraint, which may be one or more dimension coordinate constraints.

In general, a dimension coordinate constraint for a dimension of the dimensionally-modeled fact collection specifies coordinates of that dimension of the dimensionally-modeled fact collection. For example, a dimension coordinate constraint may specify coordinates of that dimension of the dimensionally-modeled fact collection by specifying a value of the dimension at a particular grain. Dimension coordinate constraints of the report query 404, then, specify a plurality of coordinates of one or more dimensions of the dimensionally-modeled fact collection, on which a report is to be based. It is noted that the lack of an explicit constraint may imply a "null constraint" (which, in and of itself, may be considered a dimension coordinate constraint) for which the resulting plurality of dimension coordinates on which the report is to be based, is all dimension coordinates from that dimension.

The fact collection query generator 406 processes the report query 404 to generate an appropriate corresponding fact collection query 408, which is presented to the dimensionally-modeled fact collection 410. A result 416 of presenting the fact collection query 408 to the dimensionally-modeled fact collection 410 is processed by a report generator 418 to generate a report corresponding to the report query 404 caused to be provided by the user 402. In particular, the generated report includes an indication of processing with respect to dimensional members as appropriate in view of the dimension coordinate constraints of the report query 404.

In one example, the dimensionally-modeled fact collection 410 is implemented as a relational database, storing fact data in a manner that is accessible to users according to a ROLAP—Relational Online Analytical Processing—schema (fact and dimension tables). In this case, the fact collection query 408 may originate as a database query, in some form that is processed into another form, for example, which is processed by an OLAP query engine into a fact collection query 408, presented as an SQL query that is understandable by the underlying relational database. This is just one example, however, and there are many other ways of representing and accessing a dimensionally-modeled fact collection.

Processing 418 is applied to the fact collection result 416 to generate a report. The generated report includes an indication of dimension members and facts corresponding to those indicated dimension members. What facts are reported may depend, at least in part, on disambiguation of what coarser grain value is determined to correspond to particular finer grain values.

Referring still to FIG. 4, the composition of the generated report may be accomplished by the fact collection query generator 406 particularly generating the fact collection query 408 in accordance with the report query, by the result processing 418 particularly processing the fact collection result (e.g., by applying filtering) in accordance with the report query, or by a combination of both.

As also illustrated in FIG. 4, the report query 404 may include a disambiguation criterion that may be provided, for example, via a user interface. In some examples, in the absence of such a disambiguation criterion, the manner in which the facts corresponding to those indicated dimension members are reported may be according to a default mode or according to a preconfigured mode. The fact collection query generator 406 and/or the result processing 418, as appropriate, operate according to the default, preconfigured or designated mode.

Figure 5:
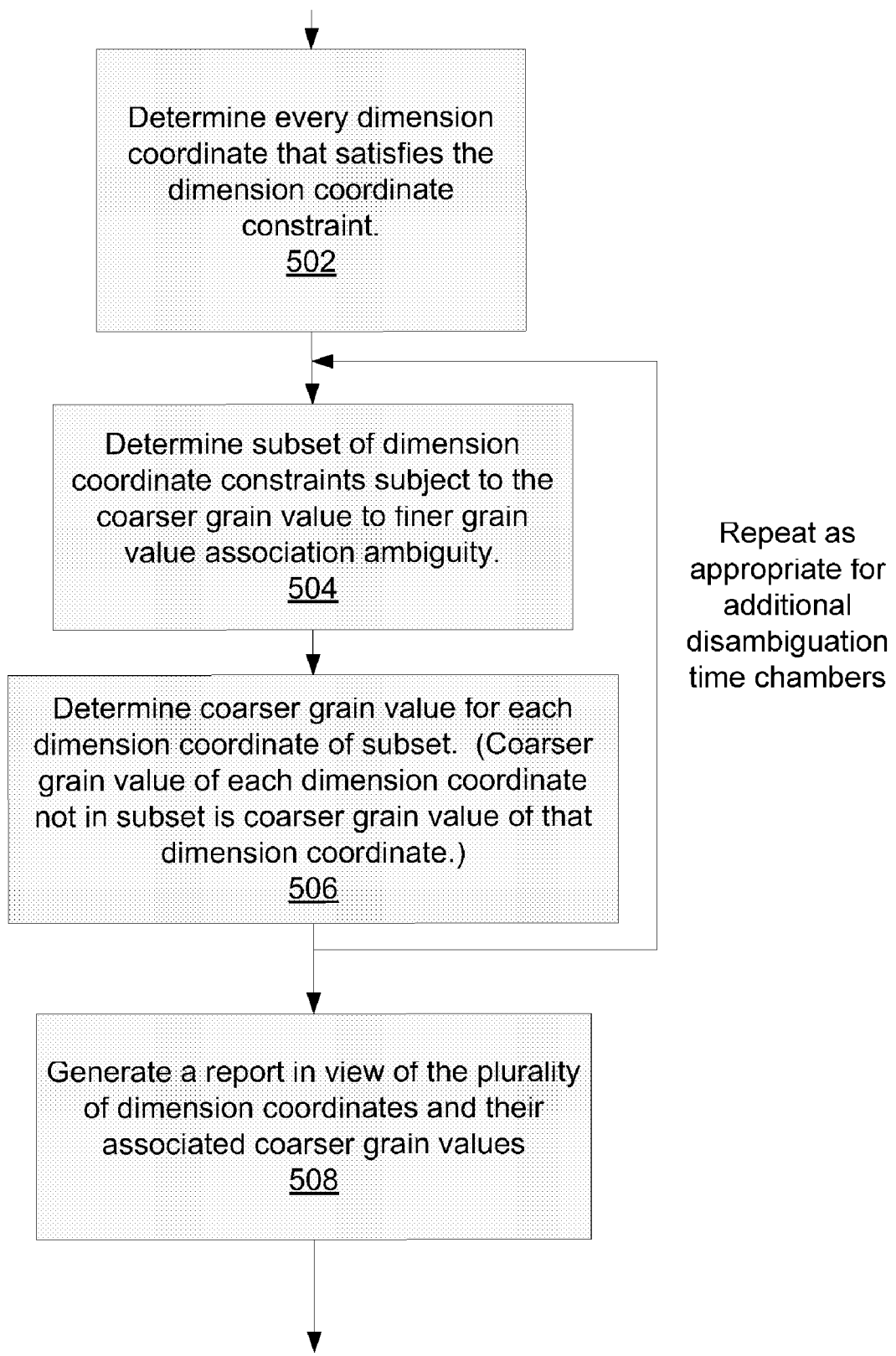
FIG. 5 is a flowchart illustrating an example of multiple-pass processing including disambiguation.

In accordance with one example, a multiple-pass processing is utilized. An example of the multiple-pass processing is illustrated by the flowchart of FIG. 5. In a first pass 502, every dimension coordinate (which may be one or more dimension coordinates) that satisfies the dimension coordinate constraint is determined. The determined dimension coordinates have a particular value at a particular grain. In another pass 504, it is determined which of the dimension coordinates are part of a subset of "ambiguous" dimension coordinates, meeting the following conditions:

Each of the dimension coordinates of the subset is such that there is at least one other dimension coordinate of the subset having a value at the finer grain ("finer grain value") that is the same as the finer grain value of that dimension coordinate; and the at least one other dimension coordinate also has a value at the coarser grain ("coarser grain value") that is different from the coarser grain value of that dimension coordinate.

That is, it is determined which of the dimension coordinates satisfying the dimension coordinate constraint of the report query are subject to the coarser grain value to finer grain value association ambiguity.

At step 506, for every unique finer grain value of the dimension coordinates of the subset, it is determined what coarser grain value to associate with all dimension coordinates of the subset having that finer grain value. In particular, the determined coarser grain value is the coarser grain value of one of the dimension coordinates, of the subset, having that finer grain value. For each of the dimension coordinates of the plurality of dimension coordinates not in the subset, the coarser grain value associated with that dimension coordinate is the coarser grain value of that dimension coordinate. Steps 504 and 506 may be repeated for additional disambiguation time chambers. That is, the subset would be determined for each additional disambiguation time chamber and disambiguation carried out as appropriate on that subset. Finally, at step 508, a report is generated in view of the plurality of dimension coordinates and their associated coarser grain values.

We have thus described how a situation may be addressed in which a subset of a plurality of dimension coordinates satisfying a dimension coordinate constraint of a report query are such that, for each dimension coordinate of the subset, there is at least one other dimension coordinate of the subset having a finer grain value that is the same as the finer grain value of that dimension coordinate and the at least one other dimension coordinate also has a coarser grain value that is different from the coarser grain value of that dimension coordinate. In particular, disambiguation may be carried out such that, for every unique finer grain value of the dimension coordinates of the subset, the coarser grain value to associate with all dimension coordinates of the subset having that finer grain value is determined, wherein the determined coarser grain value is the coarser grain value of one of the dimension coordinates, of the subset, having that finer grain value. A report may be generated in view of the plurality of dimension coordinates and their associated coarser grain values. The described methods may be carried out by at least one computing device executing computer program instructions stored on a computer-readable medium of a computer program product.

What is claimed is:

1. A computer-implemented method of processing a report query to a dimensional data model by processing a plurality of dimension coordinates that exist within the dimensional data model, wherein each of the plurality of dimension coordinates has a second particular grain ("finer grain") that is finer than a first particular grain ("coarser grain") and having a value at the finer grain ("finer grain value") and at the coarser grain ("coarser grain value"), the report query specifying a dimension coordinate constraint to which the plurality of dimension coordinates correspond, the computer-implemented method being carried out by at least one computing device executing instructions from a computer-readable medium, the method comprising:

for a temporal dimension having temporal characteristics of grain relationships including a subset of the plurality of dimension coordinates in which there is a time changing relationship of the grains over a time period of interest leading to-a potential ambiguity as to what coarser grain value to associate with a finer grain value in attributing facts at the finer grain value to the coarser grain value, wherein each of the dimension coordinates of the subset is such that there is at least one other dimension coordinate of the subset having a value at the finer grain value that is the same as the finer grain value of that dimension coordinate; and the at least one other dimension coordinate also has a value at the coarser grain value that is different from the coarser grain value of that dimension coordinate, for every unique finer grain value of the dimension coordinates of the subset, by the at least one computing device, executing computer program instructions from the computer-readable medium to determine the coarser grain value to associate with all dimension coordinates of the subset having that finer grain value, wherein the determined coarser grain value is the coarser grain value of one of the dimension coordinates, of the subset, having that finer grain value such that the relationship is disambiguated by applying a disambiguation criterion to determine the association between coarser grain values when the finer grain value is associated with at least two different coarser grain values during the time period of interest;

wherein, for each of the dimension coordinates of the plurality of dimension coordinates not in the subset, the coarser grain value associated with that dimension coordinate is the coarser grain value of that dimension coordinate;

the method further comprising by the at least one computing device, executing computer program instructions from the computer-readable medium to generate a report in view of the plurality of dimension coordinates and their associated coarser grain values.

2. The computer-implemented method of claim 1, wherein: the determining step is at least in part in view of a disambiguation criterion in the report query.

3. The computer-implemented method of claim 2, wherein: the report query directly specifies the disambiguation criterion.

4. The computer-implemented method of claim 2, wherein: the report query indirectly specifies the disambiguation criterion.

5. The computer-implemented method of claim 1, wherein: the report generating step is further in view of the at least one computing device executing computer program instructions from the computer-readable medium to process each of the plurality of dimension coordinates in accordance with the coarser grain value associated with that dimension coordinate.

6. The computer-implemented method of claim 5, wherein: the at least one computing device executing computer program instructions from the computer-readable medium to process each of the plurality of dimension coordinates in accordance with the coarser grain value associated with that dimension coordinate includes at least one of the group consisting of:

the at least one computing device executing computer program instructions from the computer-readable medium to use a metric value corresponding to the coarser grain value associated with that dimension coordinate with respect to the finer grain value of that dimension coordinate; and the at least one computing device executing computer program instructions from the computer-readable medium to use a metric value corresponding to that dimension coordinate with respect to the coarser grain value associated with that dimension coordinate.

7. The computer-implemented method of claim 1, wherein: the subset includes every dimension coordinate of the plurality of dimension coordinates meeting the conditions that there is at least one other dimension coordinate of the plurality of dimension coordinates having a finer grain value that is the same as the finer grain value of that dimension coordinate; and the at least one other dimension coordinate also has a coarser grain value that is different from the coarser grain value of that dimension coordinate.

8. The computer-implemented method of claim 1, wherein: at least one of the dimension coordinates of the subset has a finer grain value that is different from the finer grain value of at least one other dimension coordinate of the subset.

9. The computer-implemented method of claim 2, wherein: the disambiguation criterion is time based.

10. The computer-implemented method of claim 2, wherein:

the disambiguation criterion for a particular finer grain value is with respect to a time property associated with the dimension coordinates of the subset having that particular finer grain value.

11. A computer-implemented method of processing a report query to a dimensional data model by processing a plurality of dimension coordinates that exist within the dimensional data model, wherein each of the dimension coordinates has a second particular grain ("finer grain") that is finer than a first particular grain ("coarser grain") and having a value at the finer grain ("finer grain value") and at the coarser grain ("coarser grain value"), the report query specifying constraints including dimension coordinate constraints and a time reporting range constraint, the plurality of dimension coordinates corresponding to the constraints specified by the report query, the computer-implemented method being carried out by at least one computing device executing instructions from a computer-readable medium, the method comprising:

for each of a plurality of disambiguation time chambers, each disambiguation time chamber corresponding to a different non-overlapping time period of the time reporting range, for a temporal dimension having temporal characteristics of grain relationships including a subset of the plurality of dimension coordinates in which there is a time changing relationship of the grains over a time period of interest leading to a potential ambiguity as to what coarser grain value to associate with a finer grain value in attributing facts at the finer grain value to the coarser grain value, wherein each dimension coordinate of the subset is associated with the time period to which that disambiguation time chamber corresponds;

each of the dimension coordinates of the subset is
such that there is at least one other dimension
coordinate of the subset having a value at the
finer grain value that is the same as the finer grain
value of that dimension coordinate; and
the at least one other dimension coordinate also has
a value at the coarser grain value that is different
from the coarser grain value of that dimension
coordinate,
for every unique finer grain value of the dimension
coordinates of the subset, by the at least one computing device, executing computer program instructions from the computer-readable medium to determine the coarser grain value to associate with all dimension coordinates of the subset having that finer grain value, wherein the determined coarser grain value is the coarser grain value of one of the dimension coordinates, of the subset, having that finer grain value so that the relationship is disambiguated by applying a disambiguation criterion to determine the association between coarser grain values when the finer grain value is associated with at least two different coarser grain values during the time period of interest;
wherein, for each of the dimension coordinates of the plurality of dimension coordinates associated with the time period to which that disambiguation time chamber corresponds but is not in the subset, the coarser grain value associated with that dimension coordinate is the coarser grain value of that dimension coordinate;
the method further comprising by the at least one computing device, executing computer program instructions from the computer-readable medium to generate a report in view of the plurality of dimension coordinates and their associated coarser grain values.

12. The method of claim 11, wherein:
by the at least one computing device, executing computer program instructions from the computer-readable medium to generate the report includes by the at least one computing device, executing computer program instructions from the computer-readable medium to generate the report at a time resolution by which the time reporting range is characterized; and
the disambiguation time chambers are the same size as the resolution of the time reporting range.

13. The method of claim 11, wherein:
the disambiguation time chambers are larger than the resolution of the time reporting range.

14. A method of processing a report query to a dimensional data model by processing a plurality of dimension coordinates that exist within the dimensional data model, wherein each of the plurality of dimension coordinates has a second particular grain ("finer grain") that is finer than a first particular grain ("coarser grain") and having a value at the finer grain (finer grain value) and at the coarser grain (coarser grain value), the report query specifying a dimension coordinate constraint to which the plurality of dimension coordinates correspond, the method comprising:
by at least one computing device, executing computer program instructions from the computer-readable medium to process the plurality of dimension coordinates in view of a processing specification in the report query and associated coarser grain values of the plurality of dimension coordinates;
wherein, for a temporal dimension having temporal characteristics of grain relationships for a subset of the plurality of dimension coordinates in which there is a time changing relationship of the grains over a time period of interest leading to a potential ambiguity as to what coarser grain value to associate with a finer grain value in attributing facts at the finer grain value to the coarser grain value,
each of the dimension coordinates of the subset is such that there is at least one other dimension coordinate of the subset having a finer grain value that is the same as the finer grain value of that dimension coordinate;
the at least one other dimension coordinate also has a coarser grain value that is different from the coarser grain value of that dimension coordinate, and
for every unique finer grain value of the dimension coordinates of the subset, the coarser grain value to associate with all dimension coordinates of the subset having that finer grain value has been determined, wherein the determined coarser grain value is the coarser grain value of one of the dimension coordinates, of the subset, having that finer grain value so that the relationship is disambiguated by applying a disambiguation criterion to determine the association between coarser grain values when the finer grain value is associated with at least two different coarser grain values during the time period of interest; and
wherein, for each of the dimension coordinates of the plurality of dimension coordinates not in the subset, the coarser grain value associated with that dimension coordinate is the coarser grain value of that dimension coordinate;
the method further comprising by the at least one computing device, executing computer program instructions from the computer-readable medium to generate a report in view of the processing step.

15. A computer program product for processing a report query to a dimensional data model by processing a plurality of dimension coordinates that exist within the dimensional data model, wherein each of the plurality of dimension coordinates has a second particular grain ("finer grain") that is finer than a first particular grain ("coarser grain") and having a value at the finer grain ("finer grain value") and at the coarser grain ("coarser grain value"), the report query specifying a dimension coordinate constraint to which the plurality of dimension coordinates correspond, the computer program product comprising at least one non-transitory computer-readable medium having computer program instructions stored therein which are operable to cause at least one computing device to:
for a temporal dimension having temporal characteristics of grain relationships including a subset of the plurality of dimension coordinates in which there is a time changing relationship of the grains over a time period of interest leading to a potential ambiguity as to what coarser grain value to associate with a finer grain value in attributing facts at the finer grain value to the coarser grain value,
wherein
each of the dimension coordinates of the subset is such that there is at least one other dimension coordinate of the subset having a value at the finer grain value that is the same as the finer grain value of that dimension coordinate; and
the at least one other dimension coordinate also has a value at the coarser grain value that is different from the coarser grain value of that dimension coordinate, for every unique finer grain value of the dimension coordinates of the subset, determine the coarser grain value to associate with all dimension coordinates of the subset having that finer grain value, wherein the determined coarser grain value is the coarser grain value of one of the dimension coordinates, of the subset, having that finer grain value so that the relationship is disambiguated by applying a disambiguation criterion to determine the association between coarser grain values when the finer grain value is associated with at least two different coarser grain values during the time period of interest;

wherein, for each of the dimension coordinates of the plurality of dimension coordinates not in the subset, the coarser grain value associated with that dimension coordinate is the coarser grain value of that dimension coordinate;

the computer program instructions being further operable to cause the at least one computing device to generate a report in view of the plurality of dimension coordinates and their associated coarser grain values.

16. The computer program product of claim 15, wherein:
determining associated coarser grain values is at least in part in view of a disambiguation criterion in the report query.

17. The computer program product of claim 16, wherein:
the report query directly specifies the disambiguation criterion.

18. The computer program product of claim 16, wherein:
the report query indirectly specifies the disambiguation criterion.

19. The computer program product of claim 15, wherein:
the report generating is further in view of processing each of the plurality of dimension coordinates in accordance with the coarser grain value associated with that dimension coordinate.

20. The computer program product of claim 19, wherein:
the at least one computing device being operable to process each of the plurality of dimension coordinates in accordance with the coarser grain value associated with that dimension coordinate includes the at least one computing device being operable to do at least one of the group consisting of:
use a metric value corresponding to the coarser grain value associated with that dimension coordinate with respect to the finer grain value of that dimension coordinate; and
use a metric value corresponding to that dimension coordinate with respect to the coarser grain value associated with that dimension coordinate.

21. The computer program product of claim 15, wherein:
the subset includes every dimension coordinate of the plurality of dimension coordinates meeting the conditions that
there is at least one other dimension coordinate of the plurality of dimension coordinates having a finer grain value that is the same as the finer grain value of that dimension coordinate; and
the at least one other dimension coordinate also has a coarser grain value that is different from the coarser grain value of that dimension coordinate.

22. The computer program product of claim 15, wherein:
at least one of the dimension coordinates of the subset has a finer grain value that is different from the finer grain value of at least one other dimension coordinate of the subset.

23. The computer program product of claim 16, wherein:
the disambiguation criterion is time based.

24. The computer program product of claim 16, wherein:
the disambiguation criterion for a particular finer grain value is with respect to a time property associated with the dimension coordinates of the subset having that particular finer grain value.

25. A computer program product for processing a report query to a dimensional data model by processing a plurality of dimension coordinates that exist within the dimensional data model, wherein each of the dimension coordinates has a second particular grain ("finer grain") that is finer than a first particular grain ("coarser grain") and having a value at the finer grain ("finer grain value") and at the coarser grain ("coarser grain value"), the report query specifying constraints including dimension coordinate constraints and a time reporting range constraint, the plurality of dimension coordinates corresponding to the constraints specified by the report query, the computer program product comprising at least one non-transitory computer-readable medium having computer program instructions stored therein which are operable to cause at least one computing device to:

for each of a plurality of disambiguation time chambers, each disambiguation time chamber corresponding to a different non-overlapping time period of the time reporting range, for a temporal dimension having temporal characteristics of grain relationships including a subset of the plurality of dimension coordinates in which there is a time changing hierarchical relationship of the grains over a time period of interest leading to a potential ambiguity as to what coarser grain value to associate with a finer grain value in attributing facts at the finer grain value to the coarser grain value, wherein each dimension coordinate of the subset is associated with the time period to which that disambiguation time chamber corresponds;

each of the dimension coordinates of the subset is such that there is at least one other dimension coordinate of the subset having a value at the finer grain value that is the same as the finer grain value of that dimension coordinate; and the at least one other dimension coordinate also has a value at the coarser grain value that is different from the coarser grain value of that dimension coordinate, for every unique finer grain value of the dimension coordinates of the subset, determine the coarser grain value to associate with all dimension coordinates of the subset having that finer grain value, wherein the determined coarser grain value is the coarser grain value of one of the dimension coordinates, of the subset, having that finer grain value so that the relationship is disambiguated by applying a disambiguation criterion to determine the association between coarser grain values when the finer grain value is associated with at least two different coarser grain values during the time period of interest;

wherein, for each of the dimension coordinates of the plurality of dimension coordinates is associated with the time period to which that disambiguation time chamber corresponds but is not in the subset, the coarser grain value associated with that dimension coordinate is the coarser grain value of that dimension coordinate;

the computer program instructions further operable to cause the at least one computing device to generate a report in view of the plurality of dimension coordinates and their associated coarser grain values.

* * * * *